US008958987B2

(12) United States Patent
Dewas et al.

(10) Patent No.: US 8,958,987 B2
(45) Date of Patent: Feb. 17, 2015

(54) METHOD AND DEVICE FOR DETERMINING A SHIFTED CIRCULAR SEGMENT

(71) Applicant: THALES, Neuilly-sur-Seine (FR)

(72) Inventors: Emmanuel Dewas, Toulouse (FR); Vincent Savarit, Toulouse (FR); Francois Coulmeau, Seilh (FR)

(73) Assignee: Thales, Neuilly-sur-Seine (FR)

( * ) Notice: Subject to any disclaimer, the term of this patent is extended or adjusted under 35 U.S.C. 154(b) by 61 days.

(21) Appl. No.: 13/767,471

(22) Filed: Feb. 14, 2013

(65) Prior Publication Data

US 2013/0317737 A1 Nov. 28, 2013

(30) Foreign Application Priority Data

Feb. 14, 2012 (FR) ..................................... 12 00321

(51) Int. Cl.
*G01C 21/00* (2006.01)
*G08G 5/00* (2006.01)

(52) U.S. Cl.
CPC .............. *G01C 21/00* (2013.01); *G08G 5/0034* (2013.01); *G08G 5/003* (2013.01); *G08G 5/0039* (2013.01); *G08G 5/006* (2013.01)
USPC ........................................... 701/528; 701/400

(58) Field of Classification Search
None
See application file for complete search history.

(56) References Cited

U.S. PATENT DOCUMENTS

| | | | | |
|---|---|---|---|---|
| 5,925,079 | A * | 7/1999 | Peyrucain et al. | 701/4 |
| 6,405,124 | B1 * | 6/2002 | Hutton | 701/467 |
| 2005/0248470 | A1 * | 11/2005 | Berthe | 340/961 |
| 2008/0039984 | A1 * | 2/2008 | Bitar et al. | 701/3 |
| 2008/0154490 | A1 | 6/2008 | Hoofd et al. | |
| 2008/0270022 | A1 * | 10/2008 | Dewas et al. | 701/206 |
| 2009/0082955 | A1 * | 3/2009 | Sacle et al. | 701/206 |
| 2009/0132157 | A1 * | 5/2009 | Brent et al. | 701/122 |

FOREIGN PATENT DOCUMENTS

| | | | |
|---|---|---|---|
| EP | 1953728 | A1 | 8/2008 |
| FR | 2910617 | A1 | 6/2008 |

* cited by examiner

*Primary Examiner* — John R Olszewski
*Assistant Examiner* — Jeffrey Boomer
(74) *Attorney, Agent, or Firm* — Baker & Hostetler LLP

(57) ABSTRACT

A method and device for determining a shifted circular segment on the basis of an initial circular segment, the shifted circular segment being shifted by a shift distance, the method being implemented by a computer dedicated to flight management, comprises: determining a shifted final point terminating a shifted circular segment, on the basis of the final point terminating the initial circular segment, through a shift of the final point determined on the basis of the shift distance and in the direction of shift, through the use of a straight line passing through the center of the initial circular segment and the final point of the initial circular segment, and determining a shifted circular segment on the basis of the initial circular segment by construction of a circular segment between the shifted final point associated with the preceding shifted segment and the shifted final point associated with the shifted segment.

7 Claims, 7 Drawing Sheets

METHOD AND DEVICE FOR DETERMINING A SHIFTED CIRCULAR SEGMENT

CROSS-REFERENCE TO RELATED APPLICATION

This application claims priority to foreign French patent application No. FR 1200321, filed on Feb. 14, 2012.

FIELD OF THE INVENTION

The invention lies in the field of Flight Management Systems (FMS), more particularly at the level of the computation of a laterally shifted trajectory.

BACKGROUND

During flight preparation or during a rerouting, the crew stores their flight plan on a dedicated computer, known by the name of Flight Management System or FMS.

The flight plan is defined by the pilot as being a set of pairs made up of a segment and of its final point; each pair is also called a Leg. The trajectory is computed as a function of the segments and of their final points as well as of the altitude and speed conditions (which are used in particular for the computation of the radius of the circular segments).

For various reasons, the pilot may choose to shift the trajectory laterally by a distance and by a direction of shift which is determined, the direction being defined as being a shift to the right or to the left with respect to the direction of the aircraft. These operational reasons are:

- Lateral avoidance of a dangerous zone (cumulo nimbus, mountains);
- Procedure making it possible, in a zone where the air traffic control service is cut off, to laterally separate aircraft that are following one another or crossing one another;
- Lengthening of the flight plan so as to perform a synchronization with other aircraft, or to ensure the achieving of a time constraint applied to on a point of the flight plan;
- Management of an onboard communication fault (faulty radios); in this case, by procedure, the aircraft must be shifted laterally onto an unoccupied corridor.

A method commonly called lateral shifting or lateral offset is known in the prior art, making it possible to cover part of this need. However, this procedure is not suited to the whole set of segments defined in the Arinc 424 standard. It applies only for the segments of type TF, CF, FM or DF.

| Segment | Name | Meaning |
|---|---|---|
| IF | Initial Fix | Fixed initial point on the ground |
| CF | Course To a Fix | Proceed/Follow a ground track to a fixed point |
| DF | Direct to a Fix | Proceed direct (straight) to a fixed point |
| TF | Track between two Fixes | Great circle between 2 fixed points |
| AF | Arc DME to a Fix | Defines a circular arc around a specified remote DME beacon, with an aperture limit. |
| RF | Radius to a Fix | Defines a circular arc between 2 fixed points (the 1st point being the fix of the preceding segment), on a centre of the fixed circle. |
| VI | Heading to Intercept | Defines a heading to be followed until interception of the following segment |
| CI | Course to Intercept | Defines a course to be followed until interception of the following segment |
| VA | Heading to Altitude | Defines a heading to be followed until a given altitude |
| CA | Course to Altitude | Defines a course to be followed until a given altitude |
| FA | Fix to Altitude | Defines a course to be followed, starting from a fixed point, until a given altitude |
| VD | Heading to DME Distance | Defines a heading to be followed until interception of a specified DME arc |
| CD | Course to DME Distance | Defines a course to be followed until interception of a specified DME arc |
| VR | Heading to Radial | Defines a heading to be followed until interception of a specified radial |
| CR | Course to Radial | Defines a course to be followed until interception of a specified radial |
| FC | Track from Fix to Distance | Defines a course to be followed starting from a fix, over a specified distance |
| FD | Track from Fix to DME Distance | Defines a course to be followed starting from a fix, until intercepting a DME arc (specified DME distance) |
| VM | Heading to Manual | Defines a heading without termination (infinite half line) |
| FM | Fix to Manual | Defines a course, starting from a fix, without termination (infinite half line) |
| HA | | Racetrack pattern, with Altitude exit condition |
| HF | | Racetrack pattern, with a single turn |
| HM | | Manual racetrack pattern, without exit condition |
| PI | Fix to Manual | Outbound procedure defined by an outbound course starting from a fix, followed by a half turn, and interception of the initial outbound course for the return. |

Indeed, the sequences of segments of this type are deterministic, and the lateral shift is simple to compute.

FIG. 1 presents the method of shifting a segment 101 of type TF, CF, FM or DF, in accordance with the prior art and by a shift distance d. In this case the shifted segment 102 is determined by a first step during which the final point 103 is shifted by the shift distance along the bisector between the segment 101 and the following segment 104, so as to create the shifted termination point 105. Finally, the shifted segment 102 is determined so as to be of the same type as the initial segment 101 and to finish at the shifted final point 105.

FIG. 2 presents the method of shifting an initial segment 101 of type IF. In this case the shifted segment 102 is determined by a first step during which the initial termination point 103 is shifted along the perpendicular to the successor segment 104 of the said initial segment, so as to create the shifted final point 105. The shift is performed by the shift distance and along the direction of shift. Lastly the shifted segment 102 is determined so as to be of the same type as the initial segment 101 and to finish at the shifted final point.

FIG. 3 presents the method of shifting a segment 101 of racetrack type (HA, HF, HM). This special segment has the particular feature that its final point is the same as the final point of the predecessor segment. It is therefore possible to use the shifted final point of the predecessor segment (entry point) and to thereafter construct the shifted segment (the racetrack) with the same geometric characteristics (track, length, Right/Left side) as the initial segment. Moreover, during the computation of the position of the segment, if the successor (respectively preceding) segment is of type HA, HF or HM then the segment which succeeds (respectively: which precedes), the successor segment must be considered in its place. During the construction of the shifted trajectory, when the preceding (respectively following) segment is a segment of type HA, HF or HM, then the segment preceding (respectively following) the segment of type HA, HF, HM is considered for the computation of the bisector or of the perpendicular, the segment of type HA, HF, HM is however ignored by the computation of the shifted final point associated with the segment.

FIG. 4 presents the method of shifting a segment 101 of type CI, VI. The shifted final point 105 associated with the shifted segment 104 is computed by the customary methods, but starting from the shifted position of the preceding segment and considering that the segment 104 immediately succeeding the initial segment has been shifted laterally to give a new segment 401 immediately succeeding the shifted segment.

FIG. 5 presents the method of shifting a segment 101 of type CR or VR. In this case the shifted final point 105 associated with the segment CR or VR is computed by the customary procedures of the prior art, but laterally shifting the reference radial 501 by the shift distance and along the direction of shift so as to create a shifted reference radial 502.

FIG. 6 presents the method of shifting a segment 101 of type CD or VD. The shifted final point 105 associated with the shifted segment 102 of type CD or VD is computed by the customary procedures of the art, but shifting the reference beacon 601 by the shift distance perpendicularly with respect to the direction of the initial segment 101 (the reference beacon represents the centre of the circle) of the segment CD or VD in the sense of the shift so as to obtain a shifted reference beacon 602.

FIG. 7 presents the method of shifting a segment 101 of type FA. The shifted segment 102 is computed by laterally displacing the initial termination point 103 associated with the initial FA segment on the perpendicular to the direction of the said initial segment. The shift is performed on the right part with respect to the aircraft if the direction of shift is to the right and on the left part if the direction of shift is to the left. If the reference point of the segment of type FA is common with the preceding point, then the shift logic for the preceding point applies. Indeed, in the case for example of a sequence made up of a segment of type CF followed by a segment of type FA where the termination of the segment of type CF is the same as the initial point of the segment of type FA. It is therefore possible to use the shifted final point of the segment of type CF to construct the shifted type FA segment.

FIG. 8 presents the method of shifting a segment 101 of type PI. This shifted segment 102 is computed on the basis of the shifted position of the final point, since the start of the segment of type PI is always common with the final point associated with the preceding segment. The computation of its termination being done with the commonly used logic.

In the case of the first segment of a flight plan, the determination of the first shifted segment begins with the computation of the shifted position of the first final point of the said segment. In the prior art, this position is computed in the following manner:

- If the second segment of the flight plan is a segment of type TF, then the shifted final point is defined as being on the perpendicular of the departure track of the TF segment from the initial termination point and at a distance corresponding to the shift distance from the original final point.
- If the second segment of the flight plan is a segment of FM type then the shifted final point is defined as being on the perpendicular of the departure track of the segment of FM type from the initial termination point and at a distance corresponding to the shift distance from the original final point.
- If the second segment of the flight plan is a CF segment then this position is not necessary.
- If the second segment of the flight plan is a DF segment then the DF segment is constructed as a CF using the track of the previously computed DF and this position is not necessary.

However, in the operational cases explained hereinbelow, the current method does not make it possible to perform the lateral shift (since the current state of the art does not make it possible to perform a shift for a flight plan exhibiting certain types of segments):

- In lateral flight plans with performance constraints, known by the name of Required Navigation Performance or RNP, the RF and AF segments are designed to manage the turns in a deterministic manner. Now, the current function does not make it possible to solve these cases.
- In the case of circular segment of RF or AF type.
- Lastly, future functionalities such as the relative positioning between aircraft, known by the term ASAS, are not compatible with a lateral shift with the current function.

SUMMARY OF THE INVENTION

Indeed in this case the segment is of circular type and therefore its shifting is not known in the prior art. The subject of the present invention is therefore a method and a device allowing the shifting of segment of circular type in a flight plan comprising various types of segments.

There is proposed in accordance with an aspect of the invention a method for determining a shifted circular segment on the basis of an initial circular segment (101), the said shifted circular segment being shifted by a shift distance (d), in a direction of shift; the said direction being defined as being a shift to the right or to the left of the aircraft; the said initial circular segment being characterized by a centre (901), a radius (902) and a sense of rotation (903), the said initial circular segment belonging to an initial flight plan comprising a set of consecutive initial segments each comprising an initial final point; the said shifted circular segment belonging to shifted flight plan comprising a set of consecutive shifted segments each comprising a shifted final point; the said method being implemented by a computer dedicated to flight management and being characterized in that it comprises the following steps. A first step of determining a shifted final point (105) terminating a shifted circular segment (102), on the basis of the final point (103) terminating the said initial circular segment, through a shift of the said final point determined on the basis of the said shift distance and in the said direction of shift, through the use of a straight line passing through the said centre of the initial circular segment and the said final point of the initial circular segment. A second step of determining a shifted circular segment on the basis of the said initial circular segment by construction of a circular segment between the shifted final point associated with the preceding shifted segment and the said shifted final point associated with the said shifted segment.

This method allows the shifting of a circular segment, by a determined shift distance and along a given direction.

The method for shifting a segment therefore uses the shifted final point of the preceding segment. If the preceding segment is a circular segment then this shifted final point is determined using the scheme described in this invention. If the preceding segment is not a circular segment then this shifted final point is determined using the schemes known to the person skilled in the art.

According to one embodiment the said first step is furthermore adapted for determining an intermediate point (904) serving for the determination of the said shifted final point (105). This point being defined as being the point situated on the straight line passing through the centre of the said initial circular segment and the final point of the said initial circular segment and situated between the centre (901) and the final point (103) of the initial circular segment if the sense of the initial circular segment and the direction of shift are identical or else situated on the opposite side away from the centre (901) of the initial circular segment with respect to the final point (103) of the said initial circular segment, if the sense of the initial circular segment and the direction of shift are different. Moreover the point is situated at the said shift distance from the final point of the initial circular segment.

According to one embodiment the said second step is, furthermore, adapted for determining the value of an intermediate radius (905) by subtraction of the value of the said radius (902) of the said initial circular segment and of the said shift distance (d), if the sense of the initial circular segment and the direction of shift are identical. Otherwise the intermediate radius is determined by addition of the value of the said radius of the said initial circular segment and of the said shift distance if the sense of the initial circular segment and the direction of shift are different.

According to one embodiment the said second step is, furthermore, adapted for determining the centre (906) of the said shifted circular segment. This centre being defined as being the centre (901) of the initial circular segment if the said intermediate radius is greater than the value of a minimum radius or else as being on a straight line (908) equidistant to the final point of the initial segment and to the final point of the immediate predecessor segment of the said initial segment and at a distance equal to the minimum radius from the said final point of the initial segment or from the shifted final point of the immediate predecessor segment of the said shifted segment; if the said intermediate radius is less than or equal to the value of the said minimum radius. The second step is furthermore adapted for determining the shifted radius (907) of the shifted circular segment as being equal to the intermediate radius (905) if the intermediate radius is greater than the minimum radius or to the minimum radius if the intermediate radius is less than the minimum radius.

The minimum radius is given by the flight conditions and by the performance and characteristics of the aircraft. The determination of this minimum radius is known to the person skilled in the art. ($R=V^2/(g\cdot\mathrm{Tan}\ \phi)$ or V represents the estimated speed of the aircraft when turning, $\phi$ the authorized maximum roll while turning and g is the earth's gravity). This method allows the shifting of a circular segment, by a determined shift distance and along a given direction.

According to one embodiment the said first step is furthermore adapted for the determination of the said shifted final point (105), as being the point of intersection of the circle of shifted centre (906) and of shifted radius and of the shifted segment immediately succeeding the initial segment.

This method therefore allows the shifting of a circular segment, when the segment succeeding the processed segment is not tangential with the circular segment.

According to one embodiment the said first step is furthermore adapted for the determination of the said shifted final point (105), as being the said intermediate point.

Advantageously a device for determining shifted trajectory comprising, first means for determining the start of the shift of a flight plan, a shift distance and a direction of shift of the said flight plan and second means for determining on the basis of an initial flight plan, a flight plan shifted by the said shift value and the said direction of shift, the said second means being adapted for the hereinabove-described use of the methods.

BRIEF DESCRIPTION OF THE DRAWING

The invention will be better understood and other advantages will become apparent on reading the detailed description and with the aid of the figures among which:

FIG. 9.*b* presents a first embodiment for shifting a circular segment in accordance with an aspect of the invention;

FIG. 9.*c* presents a second embodiment for shifting a circular segment in accordance with an aspect of the invention;

FIG. 9.*d* presents a third embodiment for shifting a circular segment in accordance with an aspect of the invention;

FIG. 9.*e* presents a fourth embodiment for shifting a circular segment in accordance with an aspect of the invention;

FIG. 9.*f* is variant of the embodiment of FIG. 9.*e* with a successor segment of circular type instead of linear type.

DETAILED DESCRIPTION

The device for determining the shifted trajectory comprises in an embodiment of the invention the following two modules. A first module for determining the start of the shift of a flight plan, the shift distance and the direction of shift of the said flight plan. It also comprises a second module serving to determine the shifted flight plan on the basis of an initial flight plan, the said initial flight plan comprising a first set of initial and consecutive flight segments terminating respectively in a final point and the said shifted flight plan comprising a set of shifted and consecutive flight segments terminating respectively in a final point. The second module being adopted to use the whole set of methods described hereinbelow.

Figure 1:
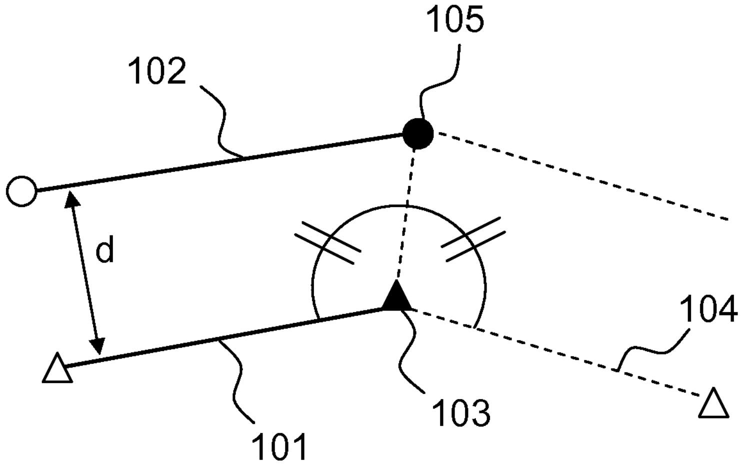
FIG.1 (Prior Art)
FIG. 1 presents the method of shifting a TF segment in accordance with the prior art.
Figure 2:
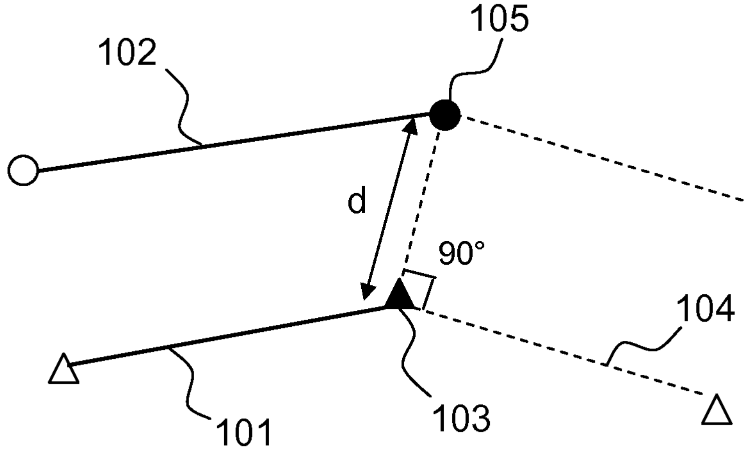
FIG.2 (Prior Art)
FIG. 2 presents the method of shifting an IF segment in accordance with the prior art.
Figure 3:
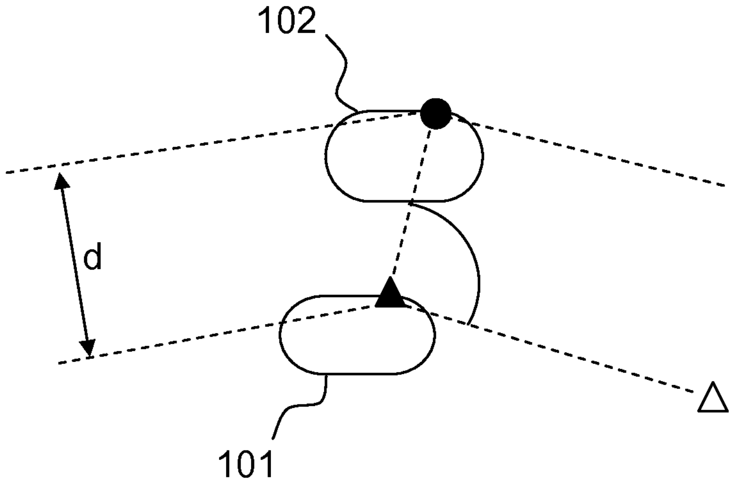
FIG.3 (Prior Art)
FIG. 3 presents the method of shifting an HA, HF, HM segment in accordance with the prior art.
Figure 4:
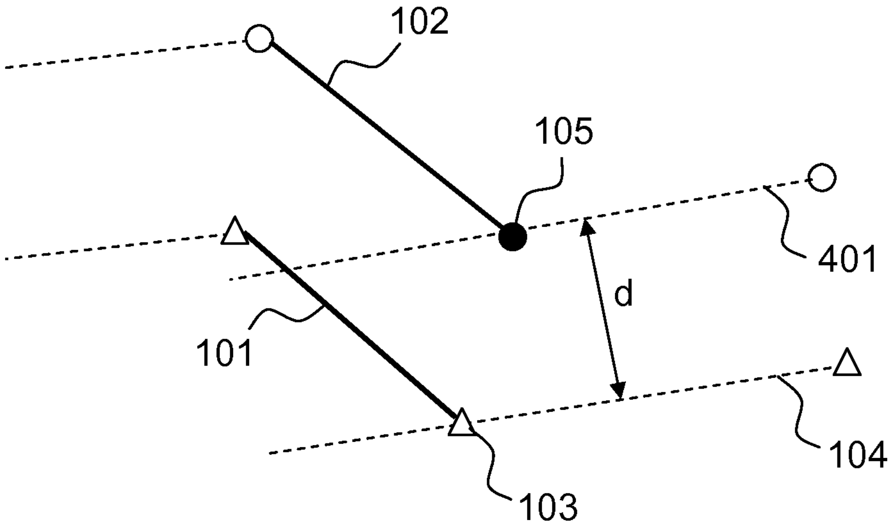
FIG.4 (Prior Art)
FIG. 4 presents the method of shifting a CI, CV segment in accordance with the prior art.
Figure 5:
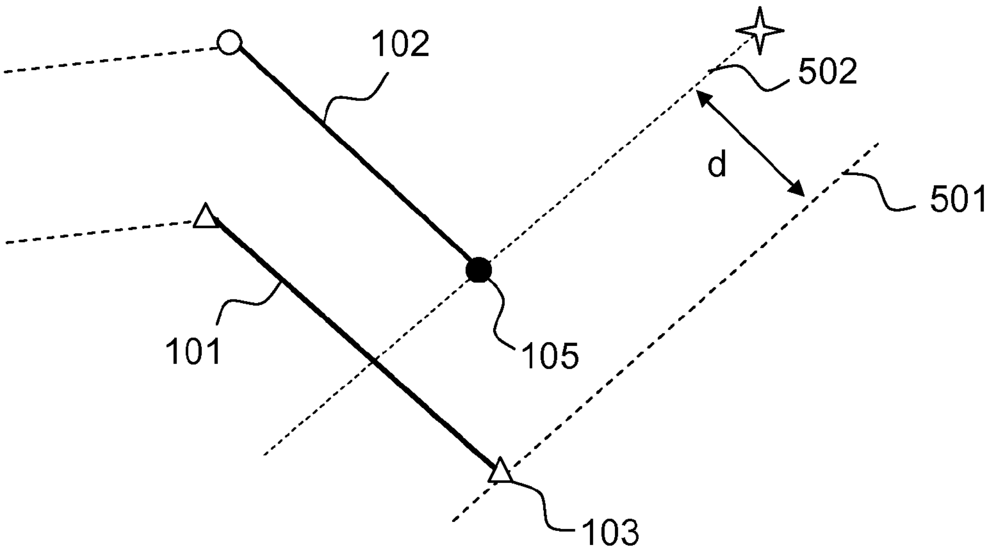
FIG.5 (Prior Art)
FIG. 5 presents the method of shifting a CR, VR segment in accordance with the prior art.
Figure 6:
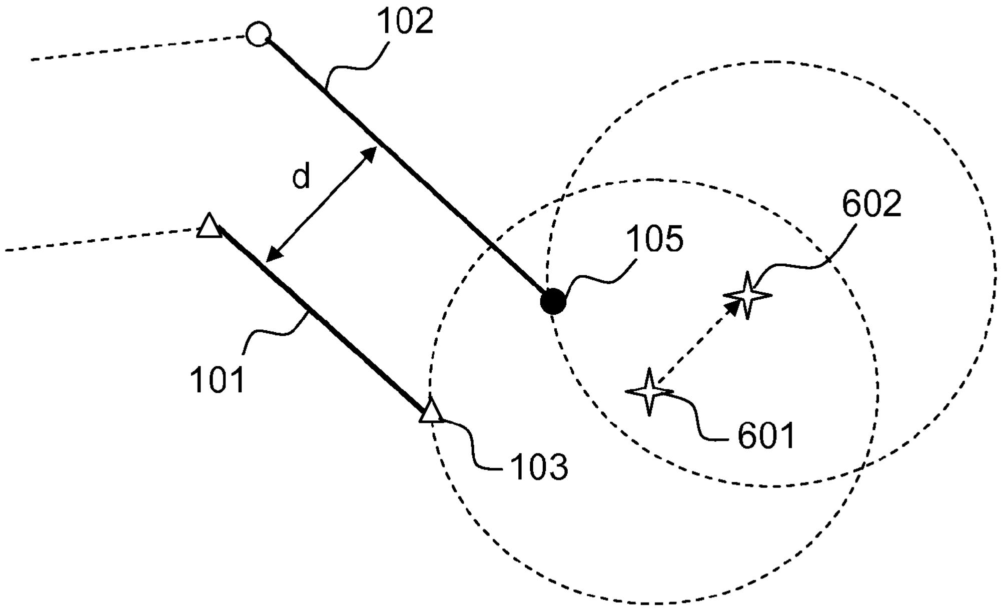
FIG.6 (Prior Art)
FIG. 6 presents the method of shifting a CD, VD segment in accordance with the prior art.
Figure 7:
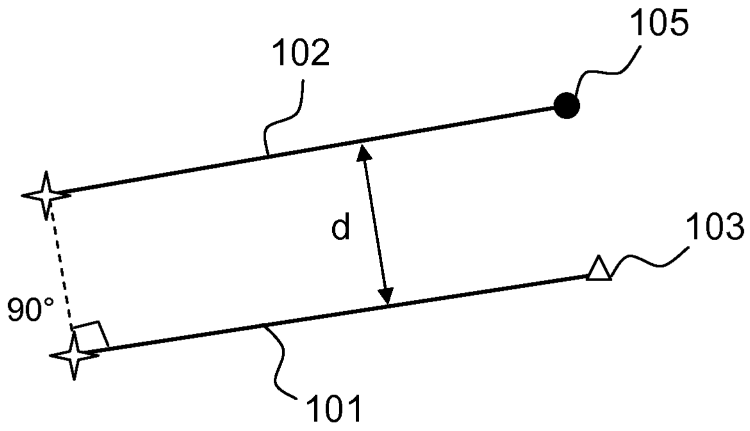
FIG.7 (Prior Art)
FIG. 7 presents the method of shifting an FA segment in accordance with the prior art.
Figure 8:
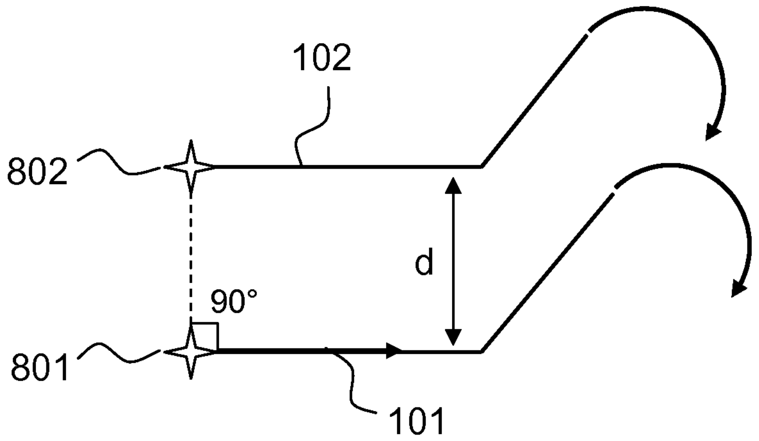
FIG.8 (Prior Art)
FIG. 8 presents the method of shifting a PI segment in in accordance with the prior art.
Figure 9A:
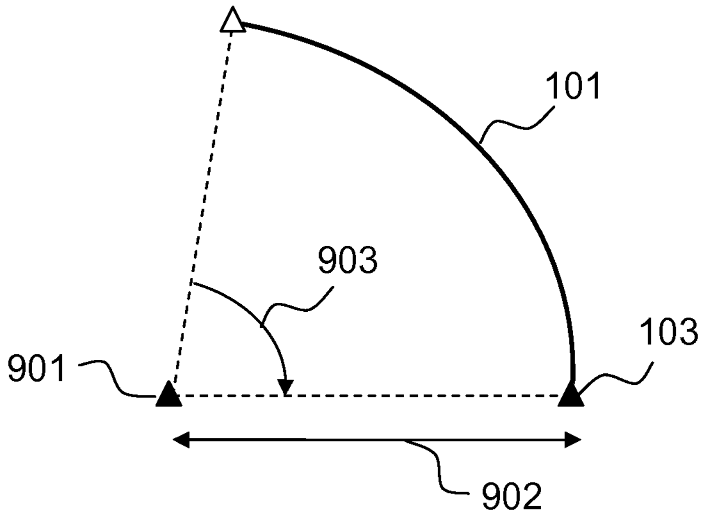
FIG.9a (Prior Art)
FIG. 9.*a* presents the description of a circular segment of defined by the prior art.
Figure 9B:
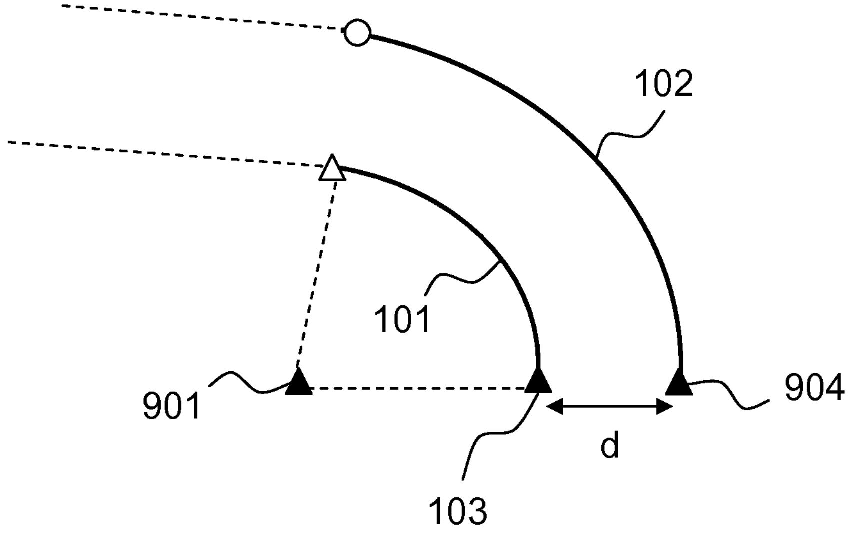
Figure 9C:
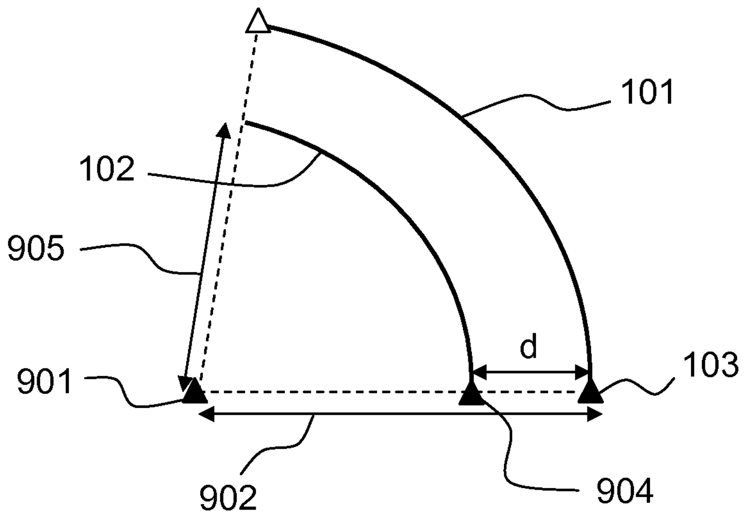
Figure 9D:
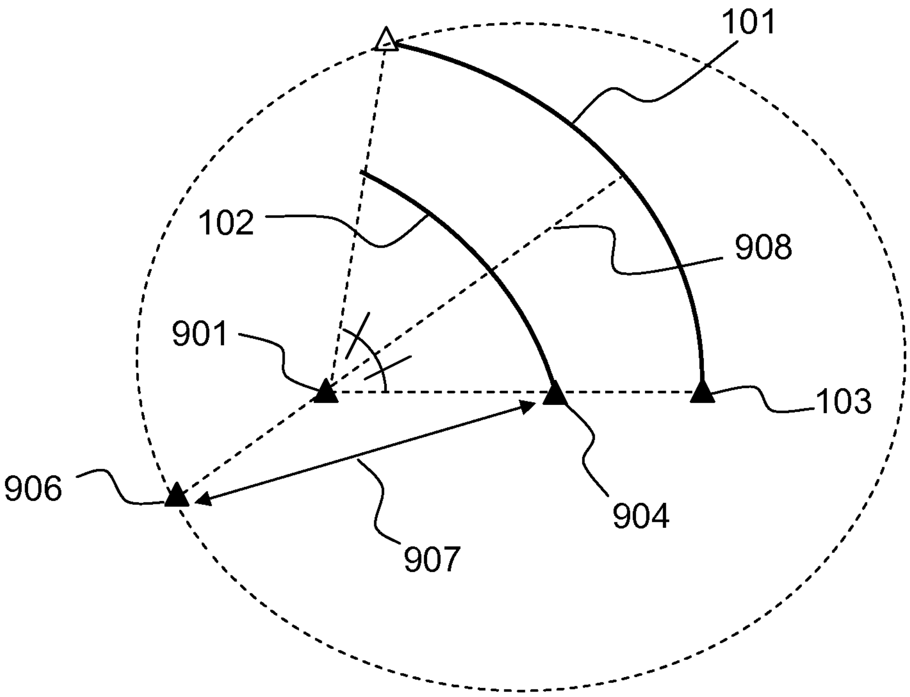
Figure 9E:
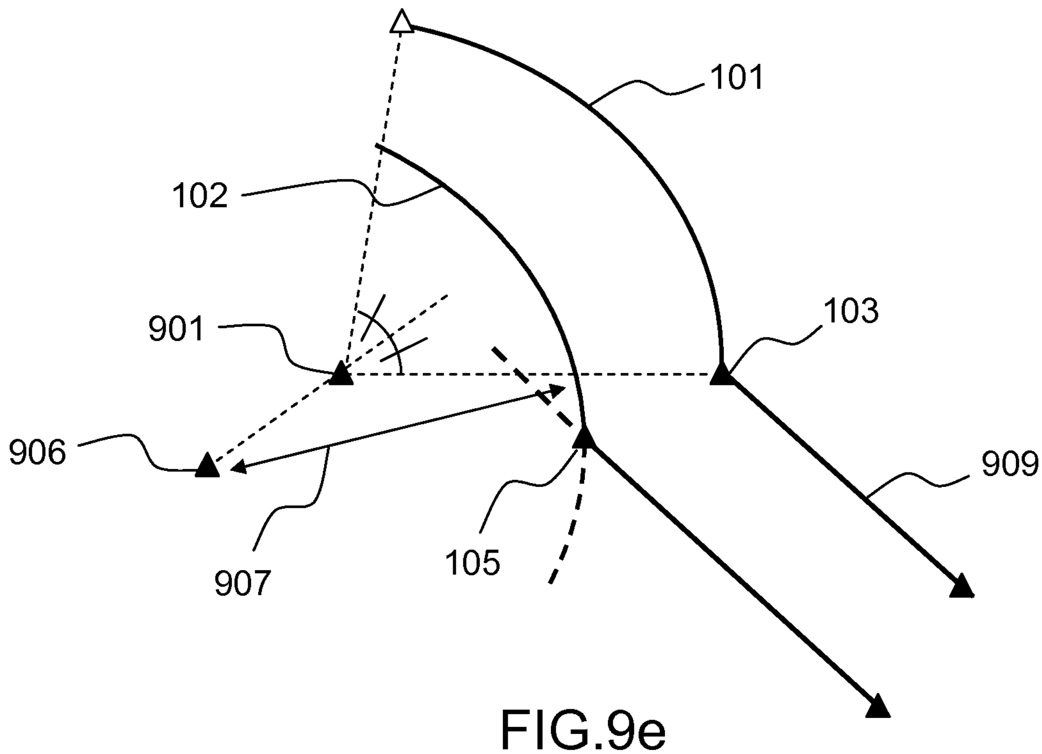
Figure 9F:
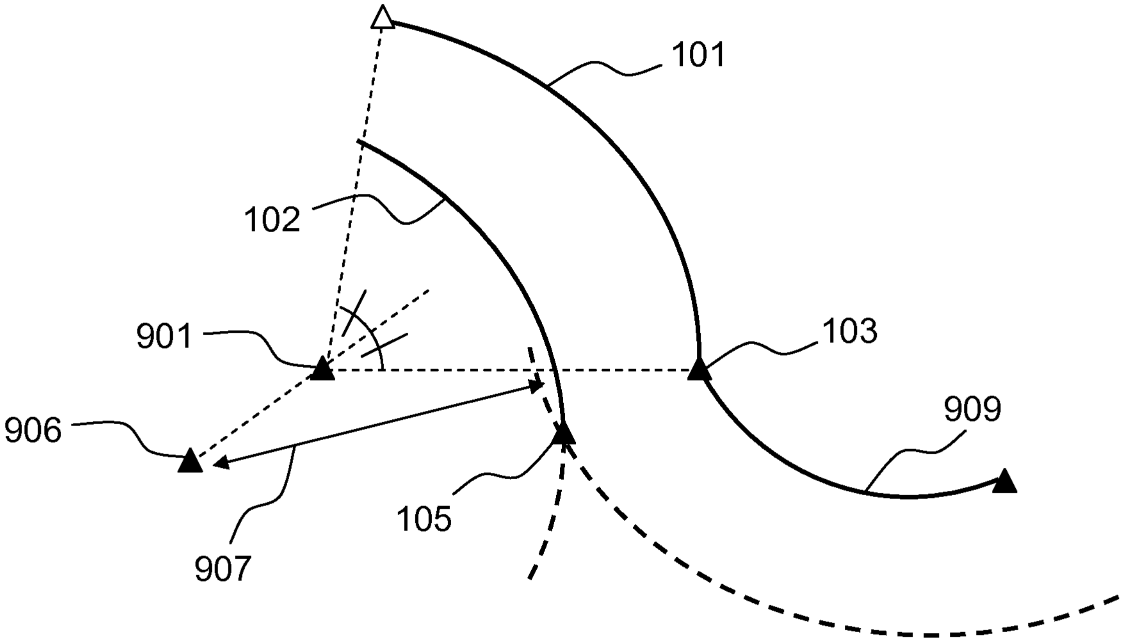

FIG. 9.*a* presents a circular segment 101 of circular type such as defined in the prior art. The circular segment is characterized in the prior art and in particular in the ARINC 424 standard by a centre 901, a termination point 103, a radius 902 and a sense of turn (right or left) 903. For its construction, the position of the final point of the preceding segment is used to define the start point of the circular segment.

The present invention proposes a method so as to laterally shift a circular segment with adaptation of the radius of the segment if possible (in particular if the shifted segment continues to comply with the minimum rotation radius of the aircraft) or without adaptation of the radius of the segment if the flight constraints are exceeded. This shift is carried out as a function of the constraints of the system, of the state of the aircraft and of its performance and of the predicted data computed by the system. This shift is by a shift distance d and along a direction of shift defined as being a shift to the right or to the left of the aircraft.

FIG. 9.*b* presents the step of determining an intermediate point 904 of the shifted segment. This first step is carried out thus:

If the turning of the circular segment is rightward and if the lateral shift has to be performed to the right then the intermediate point 904 is defined on the segment between the final point 103 of the initial circular segment and the centre 901 of the initial circular segment and at a distance equivalent to the shift distance from the final point of the initial circular segment. Likewise if the turning of the circular segment is leftward and if the lateral shift has to be performed to the left.

Otherwise if the turning of the circular segment is leftward and if the lateral shift has to be performed to the right then the intermediate point 904 is defined on the straight line between the final point 103 of the initial circular segment and the centre 901 of the initial circular segment in the opposite direction away from the centre of the initial segment with respect to the final point of the initial segment and at a distance equivalent to the shift distance from the final point of the initial circular segment. Likewise if the circular segment turning is rightward and if the lateral shift has to be performed to the left.

FIG. 9.*c* presents a step of determining an intermediate radius 905 of the shifted circular segment. If the turning of the circular segment is rightward and if the lateral shift has to be performed to the right then the intermediate radius is the subtraction of the initial radius and of the shift distance. Likewise if the turning of the circular segment is leftward and if the lateral shift has to be performed to the left.

Otherwise if the turning of the circular segment is leftward and if the lateral shift has to be performed to the right then the intermediate radius 905 is the addition of the initial radius and of the shift distance. Likewise if the circular segment turning is rightward and if the lateral shift has to be performed to the left.

FIG. 9.*d* presents a step of determining the centre 906 of the shifted segment. If the intermediate radius is greater than the minimum radius then the shifted centre 906 of the shifted circular segment is the same as the centre 901 of the initial circular segment. Moreover in this case the shifted radius 907 is the same as the intermediate radius 905.

If the intermediate radius is less than or equal to the minimum radius then the centre of the shifted segment is defined on the bisector 908 of the initial circular segment and at a distance equal to the minimum radius from the said shifted final point or from the shifted final point of the predecessor segment of the said shifted segment.

If the segment 909 which follows the circular segment 101 is tangential to the circular segment, the final point 105 of the shifted segment is defined as being the intermediate point.

Otherwise, when the segment 909 which follows the circular segment 101 is not tangential to the circular segment the following step is necessary. This step is presented in FIG. 9.*e* for a successor segment of linear type and FIG. 9.*f* for a successor segment of circular type. If the following segment 909 is a linear segment then the shifted final point 105 is defined at the intersection between the circle defined by the shifted circular segment (shifted centre and shifted radius) and the straight line parallel to the following segment, shifted and the shift distance away in the sense of the shift.

If the following segment 909 is a circular segment then the shifted final point 105 is defined at the intersection between the shifted circular segment (defined by the shifted centre and shifted radius) and the circle defined by the shifted following segment (centre and radius).

The invention claimed is:

1. A method for determining a shifted circular segment based on an initial circular segment, the shifted circular segment being shifted by a shift distance in a direction of shift, the direction of shift being to the right or to the left of an aircraft, the initial circular segment being characterized by a centre, a radius and a direction of rotation, the initial circular segment belonging to an initial flight plan comprising a set of consecutive initial segments, each of the initial segments comprising an initial final point, the shifted circular segment belonging to shifted flight plan comprising a set of consecutive shifted segments, each of the shifted segments comprising a shifted final point, the method comprising:

determining, using a computer dedicated to flight management, a shifted final point terminating the shifted circular segment, based on the initial final point terminating the initial circular segment, through a shift of the initial final point determined based on the shift distance in the direction of shift, through the use of a straight line passing through the centre of the initial circular segment and the initial final point of the initial circular segment; and determining, using the computer dedicated to flight management, the shifted circular segment based on the initial circular segment by construction of a circular segment between a shifted final point associated with an immediately preceding shifted segment and the shifted final point associated with the shifted circular segment.

2. The method according to claim 1, wherein determining the shifted final point terminating the shifted circular segment comprises:

determining an intermediate point used for determination of the shifted final point, as being a point situated on the straight line passing through the centre of the initial circular segment, and the initial final point of the initial circular segment and situated on the straight line:

between the centre of the initial circular segment and the initial final point of the initial circular segment if the direction of rotation of the initial circular segment and the direction of shift are identical, the direction of rotation of the initial circular segment being defined as a turn to the right or to the left of the aircraft, or opposite from the centre of the initial circular segment with respect to the initial final point of the initial circular segment if the direction of rotation of the initial circular segment and the direction of shift are different, and situated at the shift distance from the initial final point of the initial circular segment.

3. The method according to claim 2, wherein determining the shifted circular segment comprises determining a value of an intermediate radius by:

subtracting from a value of a radius of the initial circular segment the shift distance if the direction of rotation of the initial circular segment and the direction of shift are identical, or adding to the value of the radius of the initial circular segment the shift distance if the direction of rotation of the initial circular segment and the direction of shift are different.

4. The method according to claim 3, wherein determining the shifted circular segment comprises:

determining a centre of the shifted circular segment as being:

the centre of the initial circular segment if the intermediate radius is greater than a predetermined minimum radius, or on a straight line equidistant to the initial final point of the initial circular segment and to an intermediate final point of the immediately preceding segment of the initial circular segment, and at a distance equal to the predetermined minimum radius from the initial final point of the initial circular segment or from a shifted intermediate final point of an immediately preceding segment of the shifted circular segment, if the intermediate radius is less than or equal to the predetermined minimum radius; and determining a shifted radius of the shifted circular segment as being equal to:

the intermediate radius if the intermediate radius is greater than the predetermined minimum radius, or the predetermined minimum radius if the intermediate radius is less than the predetermined minimum radius.

5. The method according to claim 4, wherein determining the shifted final point terminating the shifted circular segment comprises determining that the shifted final point is a point of intersection between a circle having a centre equal to the centre of the shifted circular segment and a radius equal to the shifted radius of the shifted circular segment and a shifted segment immediately succeeding the initial circular segment.

6. The method according to claim 4, wherein determining the shifted final point terminating the shifted circular segment comprises determining that the shifted final point is the intermediate point.

7. A device for determining shifted trajectory comprising:

first one or more processors configured to determine a start of the shift of a flight plan, a shift distance and a direction of shift of the flight plan; and second one or more processors configured to determine, based on an initial flight plan, a flight plan shifted by the shift value in the direction of shift according to the method according to claim 1, the first and second one or more processors being integrated into the computer dedicated to flight management.

* * * * *